United States Patent
Endo et al.

(10) Patent No.: US 9,899,049 B2
(45) Date of Patent: Feb. 20, 2018

(54) MAGNETIC WRITE HEAD HAVING RECESSED TRAILING SHIELD AND TRAILING RETURN POLE

(71) Applicant: HGST Netherlands B.V., Amsterdam (NL)

(72) Inventors: Masayoshi Endo, Odawara (JP); Cherngye Hwang, San Jose, CA (US); Randall George Simmons, San Jose, CA (US); Suping Song, Fremont, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/077,831

(22) Filed: Mar. 22, 2016

(65) Prior Publication Data

US 2017/0278531 A1    Sep. 28, 2017

(51) Int. Cl.
*G11B 5/187* (2006.01)
*G11B 5/60* (2006.01)
*G11B 5/39* (2006.01)
*G11B 5/127* (2006.01)
*G11B 5/31* (2006.01)

(52) U.S. Cl.
CPC .......... *G11B 5/6082* (2013.01); *G11B 5/1278* (2013.01); *G11B 5/187* (2013.01); *G11B 5/3146* (2013.01); *G11B 5/3912* (2013.01)

(58) Field of Classification Search
CPC ...... G11B 5/1278; G11B 5/187; G11B 5/3146
USPC .............. 360/125.21, 125.23, 125.25, 125.3
See application file for complete search history.

(56) References Cited

U.S. PATENT DOCUMENTS

| | | | |
|---|---|---|---|
| 8,331,058 B2 | 12/2012 | Gider et al. | |
| 8,804,281 B1 | 8/2014 | Tang et al. | |
| 8,867,169 B2* | 10/2014 | Sasaki | G11B 5/1278 |
| | | | 360/125.21 |
| 8,964,331 B2 | 2/2015 | Sugiyama et al. | |
| 9,076,462 B2 | 7/2015 | Etoh et al. | |
| 9,082,422 B2* | 7/2015 | Sasaki | G11B 5/3163 |
| 9,099,110 B1 | 8/2015 | Chembrolu et al. | |
| 9,489,969 B1* | 11/2016 | Ikegawa | G11B 5/315 |
| 2007/0035878 A1 | 2/2007 | Guthrie et al. | |

(Continued)

OTHER PUBLICATIONS

Shimokoshi, M. et al., "Investigation for Mechanism of Far Track Interference in Hard Disk Drives," IEEE Transactions on Magnetics, vol. 51, No. 7, Jul. 2015, Article 3100908, pp. 1-8.

*Primary Examiner* — Jefferson Evans
(74) *Attorney, Agent, or Firm* — Foley & Lardner LLP

(57) ABSTRACT

A magnetic write head having trailing magnetic shield and a trailing magnetic return pole that are recessed from the media facing surface. The magnetic write head includes a write pole, a trailing shield that is separated from the write pole by a non-magnetic trailing gap layer and a trailing magnetic return pole that is connected with the trailing magnetic shield. The trailing magnetic return pole and at least a portion of the trailing magnetic shield have surfaces that face the media facing surface. The surface of the trailing magnetic return pole and at least a portion of the surface of the trailing magnetic shield taper away from the media facing surface. This recess prevents far track interference by preventing stray magnetic fields from the trailing magnetic shield and trailing magnetic return pole from inadvertently affecting the magnetic media.

10 Claims, 8 Drawing Sheets

(56) References Cited

U.S. PATENT DOCUMENTS

2009/0154012 A1\* 6/2009 Mochizuki ............. B82Y 10/00
                                                    360/123.12
2013/0033779 A1\* 2/2013 Kodama .............. G11B 5/3106
                                                    360/75

\* cited by examiner

# MAGNETIC WRITE HEAD HAVING RECESSED TRAILING SHIELD AND TRAILING RETURN POLE

FIELD OF THE INVENTION

The present invention relates to magnetic data recording and more particularly to a magnetic write head having a trailing shield and trailing return pole that are recessed from the media facing surface in order to prevent far track interference.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording bit of data. The write field then, travels through a magnetically soft under-layer of the magnetic medium to return to the return pole of the write head.

A magnetoresistive sensor such as a Giant Magnetoresistive (GMR) sensor or a Tunnel unction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

SUMMARY

The present invention provides a magnetic write head that has a magnetic write pole having a trailing edge and a pole tip that extends toward a media facing surface. The write head also includes a trailing magnetic shield that is separated from the trailing edge of the write pole by a non-magnetic trailing gap layer, and a trailing return pole that is magnetically connected with the trailing magnetic shield. The trailing return pole and at least a portion of the trailing magnetic shield are recessed away from the media facing surface relative to the pole tip of the write pole.

The trailing magnetic shield and trailing magnetic return pole can each be formed with a surface that tapers away from the media facing surface. The amount of this taper can be 7-9 degrees or about 8.5 degrees relative to the media facing surface plane.

The tapering and recessing of the trailing magnetic shield and the trailing magnetic return pole advantageously prevent far track interference by preventing stray magnetic fields from the trailing shield and trailing magnetic return pole from inadvertently magnetizing the magnetic media. However, the shape of the trailing magnetic shield and trailing magnetic return pole also provides sufficient return path for magnetic field so as to insure effective magnetic writing.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
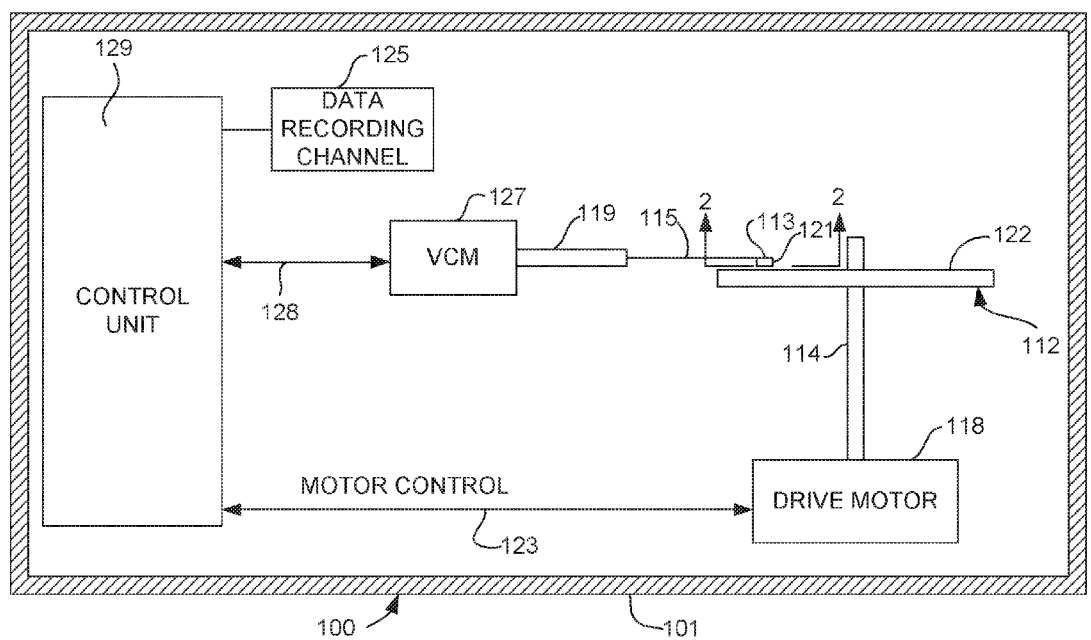
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
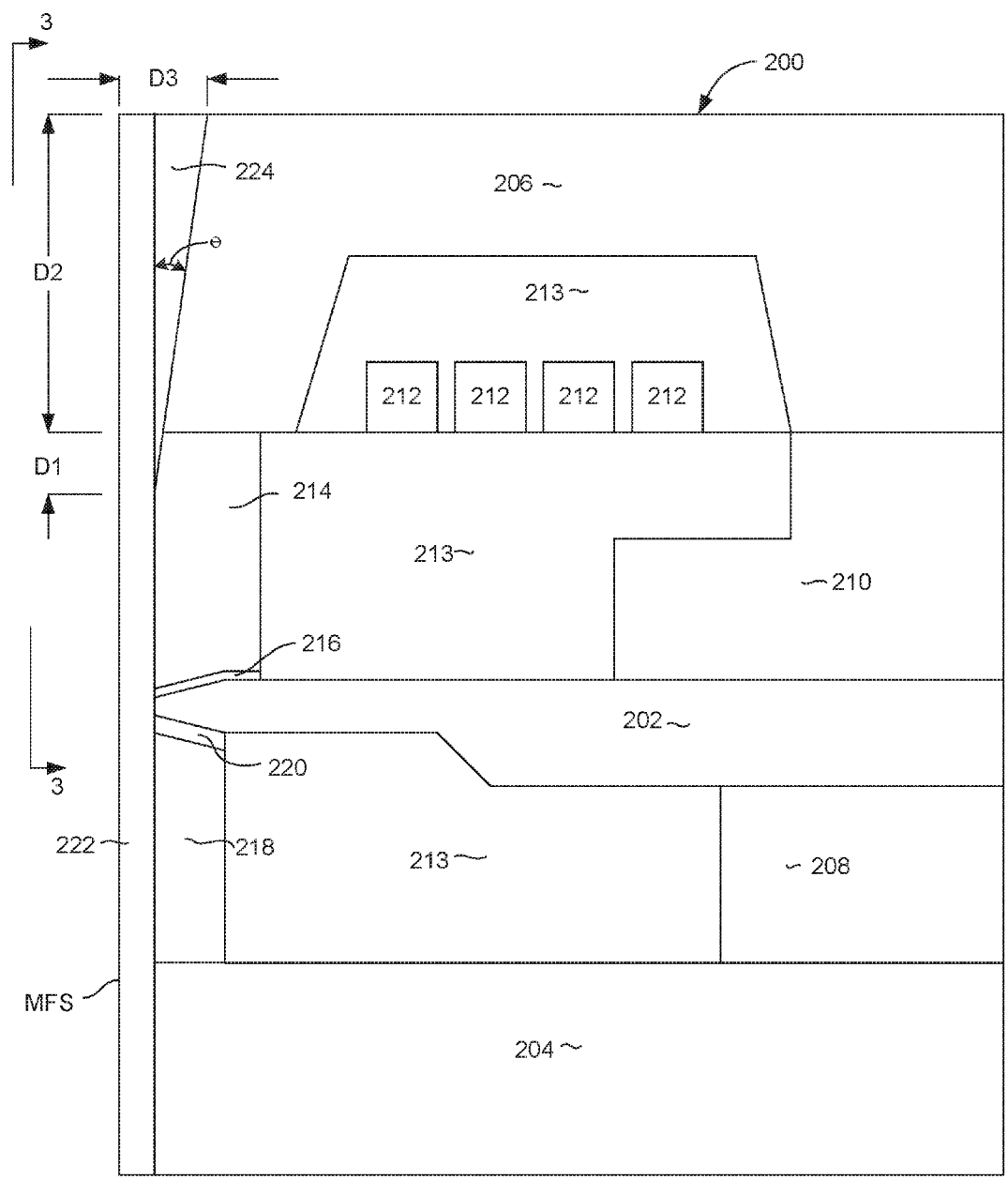
FIG. 2 is a side, cross sectional view of a magnetic write head.

FIG. 2 shows a cross sectional side view of an exemplary magnetic write head 200. The write head 200 includes a write pole 202 that extends to or nearly to a media facing surface MFS. The write head 200 can also include a leading magnetic return pole 204 and a trailing magnetic return pole 206. The leading and trailing magnetic return poles 204, 206 are magnetically connected with the write pole at a location removed from the media facing surface MFS by magnetic back gap layers 208, 210.

A non-magnetic, electrically conductive write coil 212 passes through the write head 200. The write coil can be constructed of a material such as Cu and can be embedded in a non-magnetic, electrically insulating material such as alumina 213. A non-magnetic, electrically insulting fill layer such as alumina 213 can also fill space around the write pole 202. When an electrical current flows through the write coil 212 a resulting electromagnetic field causes a magnetic flux to flow through the write pole 202 and return poles 204, 206. This results in a magnetic write field that from the tip of the write pole 202 that travels through a magnetic media (not shown in FIG. 2) to magnetize bit of data on the magnetic media. The write field travels through the magnetic media and back to the write head 200 at the return poles 204, 206, where it is sufficiently weak that it does not erase the previously recorded bit of data. One of skill in the art will appreciate that there may be different materials and configurations for the various components described above with respect to the write head, and that the description and accompanying figure are not intended to be limiting.

In order to increase field gradient, a trailing magnetic shield 214 can be provided at the media facing surface. The trailing magnetic shield 214 is separated from the write pole 202 by a non-magnetic trailing gap layer 216. In addition, a leading magnetic shield 218 may be provided in a leading direction from the write pole 202.

Figure 3:
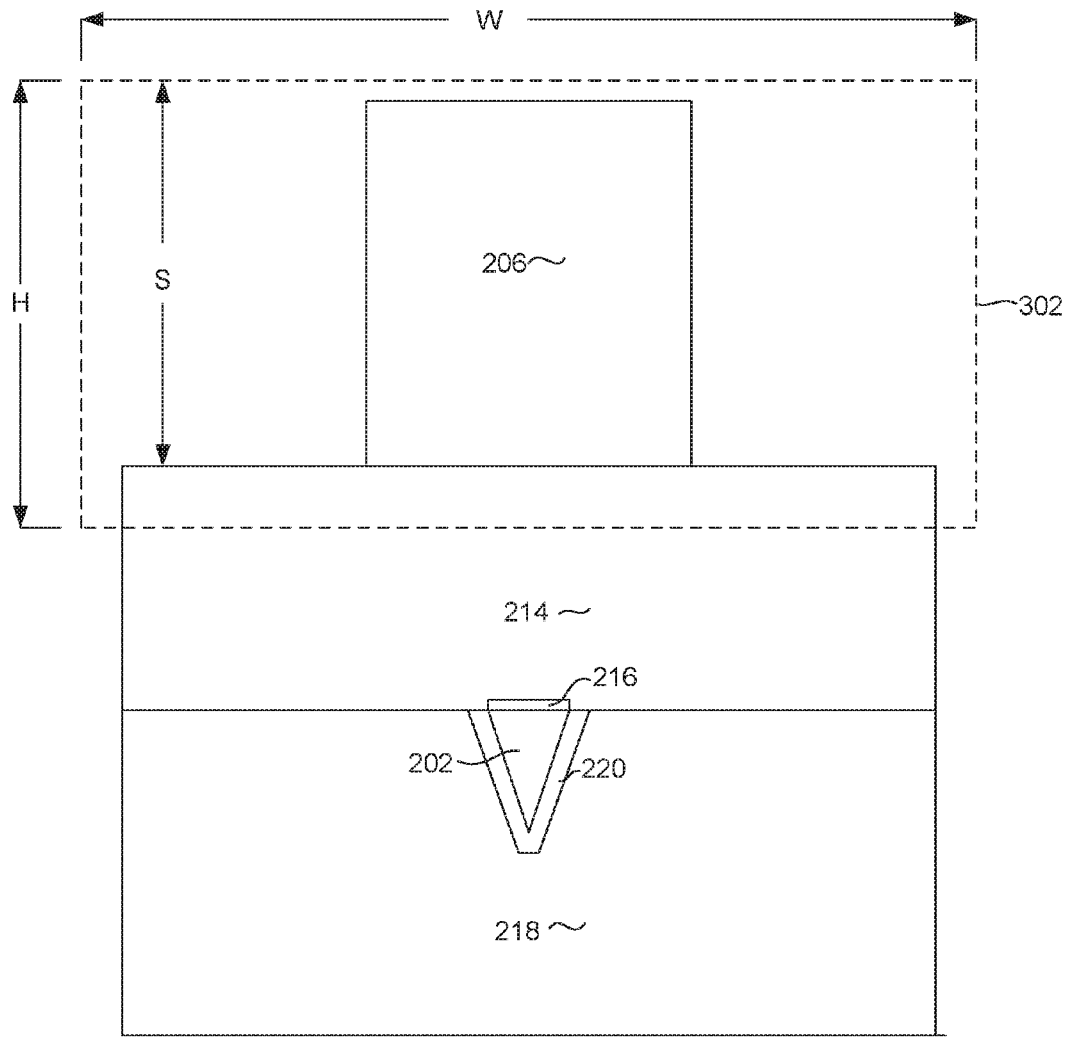
FIG. 3 is a view of a portion of the magnetic head of FIG. 2 as seen from the media facing surface.

FIG. 3 shows a view of a portion of the write head 200 as seen from the media facing surface MFS. As seen in FIG. 3, the write pole 202 has a triangular (or trapezoidal) cross-section at the media facing surface. Also, as can be seen, the leading magnetic shield 218 wraps around the write pole 202 to provide side shielding as well as functioning as a leading magnetic shield. This side shielding prevents adjacent track interference (i.e. prevents the write head from inadvertently writing to adjacent data tracks). The leading/side magnetic shield 218 is separated from the write pole 202 by a non-magnetic gap layer 220, which can be a material such as alumina or some other material or combination of materials.

With reference again to FIG. 2, it can be seen that return pole 206 and a portion of the trailing magnetic shield 214 tapers away from the rest of the media facing surface MFS by an angle theta $\theta$. Therefore, the trailing magnetic return pole 206 and trailing magnetic shield 214 are recessed. In addition, a protective overcoat 222 can be formed over the write head 200 at the media facing surface MFS. Also, the space between the protective overcoat 222 and the recessed portion of structures 214, 206 can be filled with a fill layer such as alumina 224. The protective overcoat 222 can be a material such as carbon C, or silicon Si. The advantages of the recession of the trailing shield 214 and trailing return pole 206 will be discussed in detail herein below.

One problem that arises with magnetic data recording is that of far track interference. During writing, the write head 200 can inadvertently generate a magnetic field that is remote from the write pole 202. This can occur when the magnetic structures surrounding the write pole 202 become excessively magnetized, either from the magnetic field generated by the write head 200, or from external magnetic fields. It has been found that a major source of such far track interference comes from magnetization of the trailing shield 214 and trailing return pole 206. While these structures 214, 206 provide improved field gradient and provide a return path for magnetic write field, the effects of such far track interference can be mitigated by recessing the trailing magnetic shield 214 and trailing return pole 206 as shown.

The recession of the trailing magnetic shield 214 and trailing magnetic return pole 206 increases the spacing between these structures and the magnetic media (not shown), which minimizes the effects that these structures 214, 206 can have on inadvertently magnetizing the media (far track interference). Therefore, the amount taper angle $\theta$ and recession of these structures 214, 206 involves a tradeoff between providing sufficient return path for the write field and preventing far track magnetic interference.

An optimal structure for accommodating both of these competing interests is achieved by controlling the taper angle $\theta$ and amount of recess. To this end, the taper angle $\theta$ is preferably 8-9 degrees and more preferably about 8.5 degrees. As shown in FIG. 2, only a portion of the trailing magnetic shield 214 is tapered, this tapered portion has a dimension D1 that is measured from the initiation point of the taper to the end of the trailing magnetic shield where the trailing magnetic shield meets the trailing return pole 206. The dimension D1 is preferably 0.1-0.5 um or about 0.3 um. On the other hand, the entire end of the trailing magnetic return pole can be tapered, defining a tapered portion D2 that extends from its leading-most edge at its interface with the trailing return pole 214 to its trailing most end. This dimension D2 is preferably 0.3-1.0 um or about 0.7 um. At its trailing-most end the taper defines a recess dimension D3, where the taper provides its deepest amount of recess from the media facing surface MFS. This maximum recess dimension is preferably 0.10-0.20 um or about 0.15 um.

In addition, another advantage provided by the recessed trailing shield and return pole is that contact between the trailing shield and the media is avoided. Typically, the trailing shield and return pole are the portions of the write head that extend furthest toward the media during operation. By recessing these structures, inadvertent contact between the magnetic media and the trailing shield 214 and trailing return pole 206 is avoided. This allows the write head to fly at lower fly-heights, which increases the achievable areal density. In order to maximize this benefit, the optional fill layer 224 can be eliminated so that protective overcoat 222 can actually taper away from the magnetic media.

Figure 4:
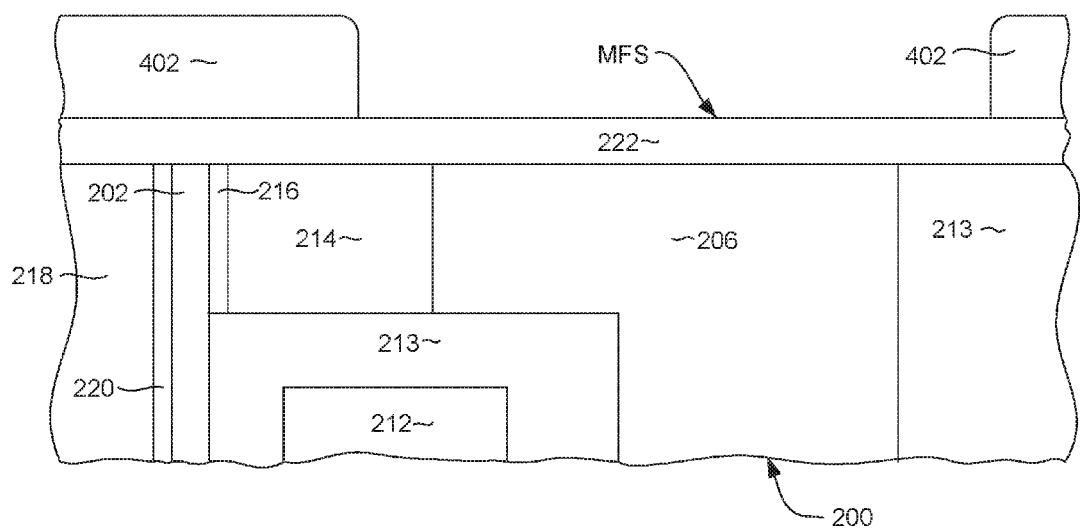
FIGS. 4-7 show a cross sectional view of a magnetic write head in various intermediate stages of manufacture to illustrate a method for manufacturing a magnetic write head.

FIGS. 4-7 show a cross-sectional view of a magnetic write head in various intermediate stages of manufacture in order to illustrate a method of manufacturing a magnetic write head having a recessed trailing magnetic shield and recessed trailing return pole such as described above. With particular reference to FIG. 4, a magnetic write head 200 is formed. As those skilled in the art will appreciate, many such write heads can be formed on a water, which is then sliced into rows of magnetic heads and lapped to define a media facing surface MFS. A mask 402 is then formed over the media facing surface MFS of the write head 200. The mask 402 has an opening that is located over the trailing return pole 206 and over a portion of the trailing magnetic shield 214. The opening can be better understood with reference to FIG. 3. Although FIG. 3 illustrates a media facing surface view of a finished head, the dashed line 302 indicates where the mask opening would be located relative to the trailing magnetic shield 214 and trailing return pole 206. As shown in FIG. 3, the mask opening 302 preferably has a height H that is about 1.5 um and a width W that is about 37 um. In addition, the opening can define a spacing S as measured from the trailing magnetic shield 214 to the trailing-most portion of the opening, where the spacing S is about 1.2 um.

As discussed above, a benefit of the recession of the trailing shield 214 and trailing return pole 206 is that contact with the media is avoided, and a lower fly-height can be achieved. In order to maximize this benefit, the size of the mask opening 302 can be increased in order to increase the area of the write head that is recessed. A resulting structure will be described below with reference to FIG. 8.

Figure 5:
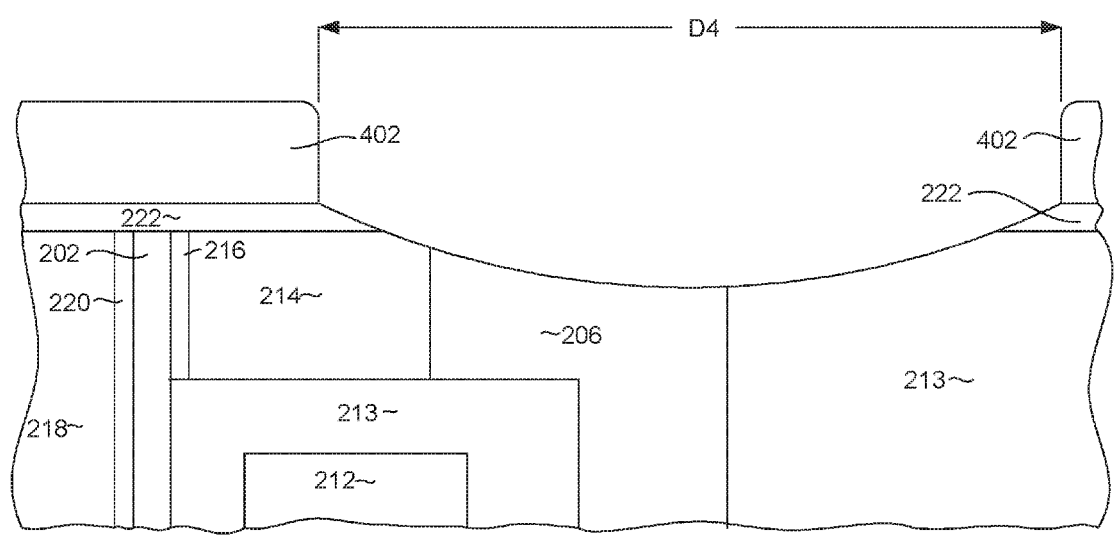

With reference now to FIG. 5, a material removal process such as ion milling is performed to remove portions of the trailing magnetic return pole 206 and trailing magnetic shield that are exposed by the opening in the mask 402. The ion milling can be performed at one or more angles relative to normal so that shadowing from the mask 402 results in a tapered shape on the trailing return pole 206 and trailing shield 214 as shown.

Figure 6:
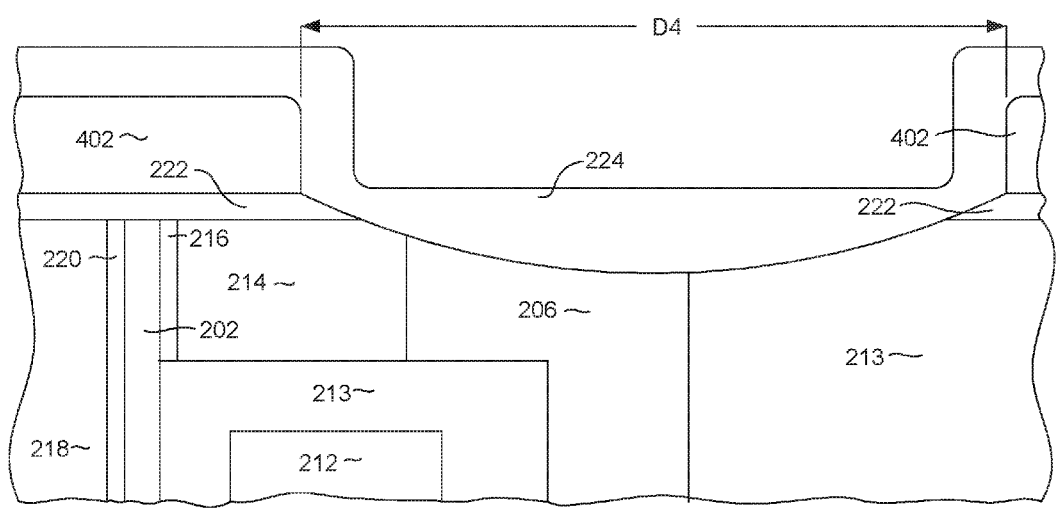
Figure 7:
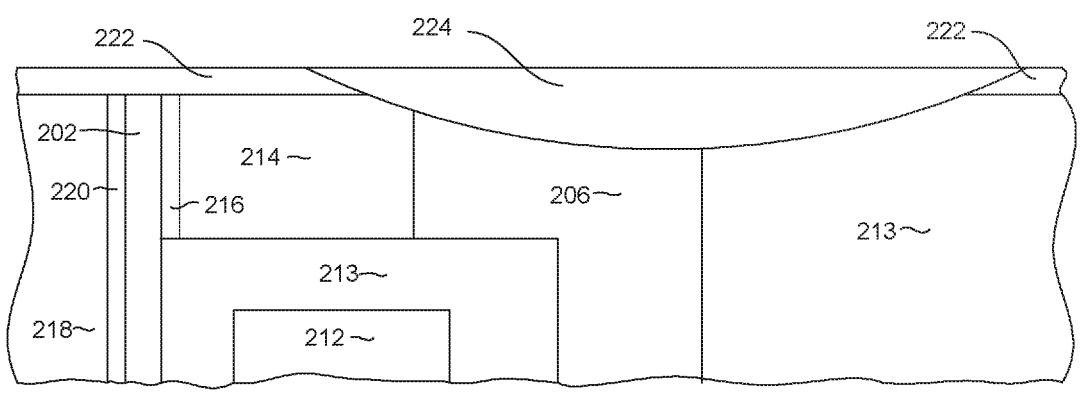

Then, with reference to FIG. 6, a non-magnetic fill layer such as alumina ($Al_2O_3$) 224 is deposited. After depositing the fill layer 224 the mask 402 can be lifted off, and then a planarization process such as chemical mechanical polishing (CMP) can be performed, leaving a structure such as that shown in FIG. 7. After these processes have been performed, other processes (sometimes referred to as advanced final lapping) can be performed to form a desired air bearing surface shape as desired.

Figure 8:
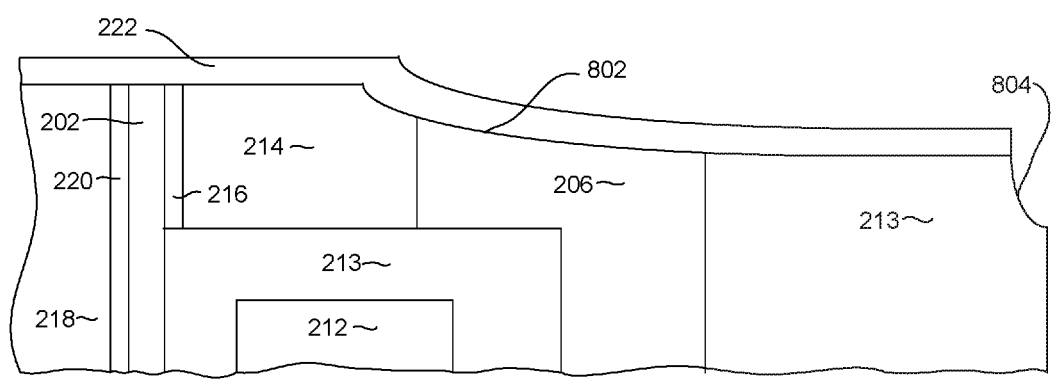
FIG. 8 shows a cross sectional view of a magnetic head according to an alternate embodiment for decreasing magnetic spacing.

Alternatively, the mask 402 can be formed with a much larger opening 302 (FIG. 3) so as to form a sloped portion 802 that extends all of the way to trailing end of the slider as shown in FIG. 8. A further etching process can be performed to form a notch 804 at the trailing edge of the slider. In this case, the alumina refill (such as 224 in FIG. 7) can be omitted so that the slider can be formed to slope away from the media (not shown in FIG. 8). This configuration advantageously prevents the trailing edge of the slider (including the trailing shield 214 and trailing magnetic return pole 206 from contacting the media, thereby allowing the fly-height and the corresponding magnetic spacing to be reduced for improved areal data density.

While various embodiments have been described above, it should be understood that they have been presented by way of example only and not limitation. Other embodiments falling within the scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic write head, comprising:
a magnetic write pole having a trailing edge and having a pole tip that extends toward a media facing surface;
a trailing magnetic shield separated from the trailing edge of the write pole by a nonmagnetic trailing gap layer; and
a trailing return pole magnetically connected with the trailing magnetic shield;
wherein the trailing return pole and at least a portion of the trailing magnetic shield are recessed from the media facing surface relative to the pole tip of the magnetic write pole,
wherein the trailing return pole and at least a portion of the trailing magnetic shield taper away from the media facing surface at an angle of 7-9 degrees, and
wherein the trailing return pole has a trailing portion that is recessed a distance of 0.10-0.20 um.

2. The magnetic write head as in claim 1, wherein the trailing return pole has a trailing portion that is recessed a distance of about 0.15 um.

3. The magnetic write head as in claim 1, further comprising a protective overcoat at the media facing surface.

4. The magnetic write head as in claim 3, wherein a tapered section between the protective overcoat and the trailing return pole and at least a portion of the trailing magnetic shield is filled with non-magnetic material.

5. A magnetic write head, comprising:
a magnetic write pole having a trailing edge and having a pole tip that extends toward a media facing surface;
a trailing magnetic shield separated from the trailing edge of the write pole by a nonmagnetic trailing gap layer; and
a trailing return pole magnetically connected with the trailing magnetic shield;
wherein the trailing return pole and at least a portion of the trailing magnetic shield are recessed from the media facing surface relative to the pole tip of the magnetic write pole,
wherein the trailing return pole and at least a portion of the trailing magnetic shield taper away from the media facing surface at an angle of 7-9 degrees, and
wherein the portion of the trailing magnetic shield that is recessed from the media facing surface measures 0.1-0.5 um in a data track direction.

6. The magnetic write head as in claim 5,
wherein the portion of the trailing magnetic shield that is recessed from the media facing surface measures about 0.3 um in a data track direction.

7. A magnetic write head, comprising:
a magnetic write pole having a trailing edge and having a pole tip that extends toward a media facing surface;
a trailing magnetic shield separated from the trailing edge of the write pole by a nonmagnetic trailing gap layer; and
a trailing return pole magnetically connected with the trailing magnetic shield;
wherein the trailing return pole and at least a portion of the trailing magnetic shield are recessed from the media facing surface relative to the pole tip of the magnetic write pole,
wherein the trailing return pole and at least a portion of the trailing magnetic shield taper away from the media facing surface at an angle of 7-9 degrees, and wherein the trailing return pole has an end that faces the media facing surface and is recessed from the media facing surface and that measures 0.3-1.0 um in a data track direction.

8. The magnetic write head as in claim 7 wherein the trailing return pole measures about 0.7 um in a data track direction.

9. A magnetic data recording system, comprising:
a housing;
a magnetic media;
an actuator mounted within the housing;
a slider connected with the actuator for movement adjacent to a surface of the magnetic media; and
a magnetic write head formed on the slider, the magnetic write head further comprising:
  a magnetic write pole having a trailing edge and having a pole tip that extends toward a media facing surface;
  a trailing magnetic shield separated from the trailing edge of the write pole by a nonmagnetic trailing gap layer; and
  a trailing return pole magnetically connected with the trailing magnetic shield;
  wherein the trailing return pole and at least a portion of the trailing magnetic shield are recessed from the media facing surface relative to the pole tip of the magnetic write pole,
  wherein the trailing return pole and at least a portion of the trailing magnetic shield taper away from the media facing surface at an angle of 7-9 degrees, and
  wherein the trailing return pole has a trailing portion that is recessed a distance of 0.10-0.20 um.

10. The magnetic data recording system as in claim 9, wherein the trailing return pole has a trailing portion that is recessed a distance of about 0.15 um.

* * * * *